United States Patent [19]

Okuda et al.

[11] Patent Number: 5,062,688
[45] Date of Patent: Nov. 5, 1991

[54] FLAT PLATE OPTICAL ELEMENT AND METHOD FOR PREPARING THE SAME

[75] Inventors: Eiji Okuda; Hiroyuki Nemoto, both of Osaka, Japan

[73] Assignee: Nippon Sheet Glass Co., Ltd., Osaka, Japan

[21] Appl. No.: 582,315

[22] Filed: Sep. 14, 1990

[51] Int. Cl.$^5$ ............................ G02B 27/00; G02B 6/10
[52] U.S. Cl. ...................................... 359/619; 427/165; 427/169; 359/652; 385/124; 385/130
[58] Field of Search ................ 350/96.31, 413, 167; 427/164, 165, 169

[56] References Cited

U.S. PATENT DOCUMENTS

| | | | |
|---|---|---|---|
| 3,817,730 | 6/1974 | Uchida | 350/96.12 |
| 4,509,824 | 4/1985 | Yamasaki et al. | 350/413 |
| 4,778,256 | 10/1988 | Serizawa | 350/413 |
| 4,805,997 | 2/1989 | Asahara et al. | 350/413 |
| 4,844,589 | 7/1989 | Asahara et al. | 350/413 |
| 4,971,423 | 11/1990 | Nakata et al. | 350/96.31 |

*Primary Examiner*—Bruce Y. Arnold
*Assistant Examiner*—Martin Lerner
*Attorney, Agent, or Firm*—Sughrue, Mion, Zinn Macpeak & Seas

[57] ABSTRACT

A flat plate optical element and a method for preparing the same are disclosed, which flat plate optical element comprises an optical element with a predetermined pattern formed by ion diffusion from a restricted region within a flat substrate, wherein an ion diffusion layer having a uniform thickness is formed with the same ions as those used for forming the optical element on the whole surface of the substrate opposite to the surface on which the optical element is formed, and the total volume of the optical element is substantially equal to the total volume of the ion diffusion layer.

9 Claims, 2 Drawing Sheets

FLAT PLATE OPTICAL ELEMENT AND METHOD FOR PREPARING THE SAME

FIELD OF THE INVENTION

This invention relates to a flat plate optical element having an optical element such as fine lens, light waveguide, etc. integrally formed through ion diffusion with a substrate shaped in flat plate, particularly to a technique which prevents abnormal deformation of the substrate when forming such element within a thin substrate.

BACKGROUND OF THE INVENTION

In the following, description is made by referring to an example of a flat plate microlens. A flat plate microlens is a lens array having a large number of fine lens portions having a higher refractive index than the surrounding portion formed by arrangement planarly within a glass substrate. It is generally prepared by coating the surface of a flat glass substrate with a masking material provided with an opening in a predetermined lens arrangement pattern, and permitting ions such as thallium (Tl) ions, cesium (Cs) ions, etc. to be internally diffused through the masking material opening by way of exchange with the ions within the glass substrate, thereby forming a lens portion with approximately semicircular cross-section having a refractive index distribution based on the concentration distribution of the diffused ions.

When an optical element is integrally formed within a glass substrate by ion diffusion as described above, local stress is generated on the diffusion surface side of the substrate due to the difference in ion radius between the diffused ions and the exchanged ions, whereby there is the problem that warping deformation occurs due to the difference in stress strain between both surfaces of the substrate. Particularly, when the thickness of the substrate is made thin as 1 mm or less, the amount of deformation becomes markedly large, whereby there is the problem that the lens substrate thickness cannot be made so thin. On the other hand, from an intention to make the device having a lens array assembled therein compact, it has been strongly demanded to make also the above-mentioned thickness of the substrate as thin as possible.

As one method to remove the stress strain difference between both surfaces of the lens substrate, there is also proposed a method which forms lens arrays with the same pattern on both surfaces of the substrate. However, according to this method, individual optical system is a combined lens comprising two lenses, whereby there is involved an essential problem that no desired optical performance can be obtained.

Having described above by referring to an example of lens, the situation is the same also when forming other optical elements such as light waveguide, etc. within a glass substrate.

SUMMARY OF THE INVENTION

An object of the present invention is to provide a flat plate optical element free from deformation such as warping and excellent in optical characteristics without disturbance of the direction of the incident ray at the opposite surface.

Another object of the present invention is to provide a method for preparing the above-described flat plate optical element.

Other objects and effects of the present invention will be apparent from the following description.

The present invention relates to a flat plate optical element comprising an optical element with a predetermined pattern formed by ion diffusion from a restricted region within a flat substrate, wherein an ion diffusion layer having a uniform thickness is formed with the same ions as those used for forming the optical element on the whole surface of the substrate opposite to the surface on which the optical element is formed, and the total volume of the optical element is substantially equal to the total volume of the ion diffusion layer.

DETAILED DESCRIPTION OF THE INVENTION

Figure 1:
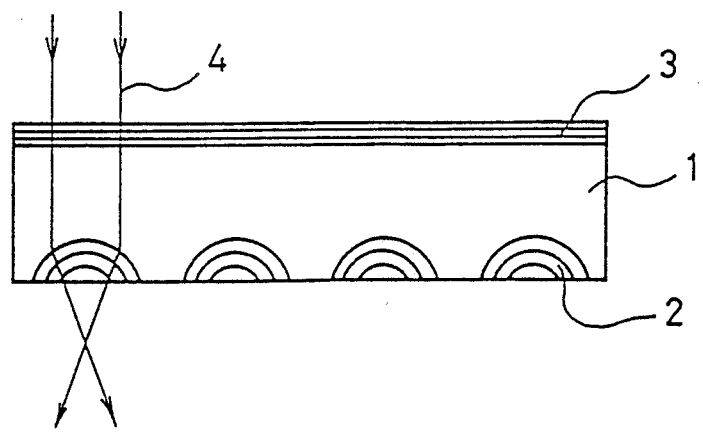
FIG. 1 is a sectional view showing an embodiment of the present invention.

As the flat substrate, the ion to be diffused and the method for ion diffusion, those conventionally used in the art may be employed in the present invention, as described, e.g., in U.S. Pat. Nos. 4,509,824 and 3,817,730 incorporated herein by reference.

As the flat substrate, glass containing a mono-valent cation such as $Na^+$, $K^+$, etc. may be used.

The ion diffusion into the flat substrate may be carried out by incorporating an ion capable of heightening the refractive index of glass into the substrate. It is preferably carried out by contacting the substrate with a medium (preferably a molten salt) containing a mono-valent cation capable of being substituted with the mono-valent cation contained in the substrate, such as $Tl^+$, $Cs^+$, $Li^+$, etc.

The molten salt may be a nitrate or a sulfate of the above cation, and a nitrate is preferably used. Specific examples of the molten salt include a mixed salt of $TlNO_3$ and $KNO_3$ which may further contain $NaNO_3$ and $LiNO_3$ if desired.

As the method for ion diffusion into the glass substrate, the method of dipping the substrate in a molten salt containing the ions to be diffused is simple and effective, and thus is preferably used in the present invention, but the method of ion implantation, in which the ion is accelerated and shot into the substrate from its surface, may be included in the ion diffusion employed herein.

In the case where a molten salt is used, by coating one surface side of the substrate with a masking film provided with an opening of a predetermined optical element pattern, and also leaving the back surface side to have the substrate surface exposed as such without provision of a masking film, an optical element can be formed on one surface side, and an ion diffusion layer having a uniform thickness on the other surface side. As the masking film, materials, which are not corroded by a molten salt, can easily be provided on the substrate, and do not transmit the ion to be diffused, may be used. A Ti film is preferably used as the masking material.

However, when the dipping treatment is simply practiced as described above, the diffused areas will greatly differ between the optical element forming surface side and the back surface side, whereby there is generally created a difference in volume of diffusion regions to the same extent as the ratio of the mask opening area on the optical element forming surface side to the substrate surface area.

In other words, the volumes of the ion diffusion regions differ by about several times between both sides of the substrate, whereby the stress strain difference is still great although somewhat alleviated as compared with the case when providing no uniform diffusion layer, and therefore warping deformation of the substrate caused thereby cannot be made so small.

One method to make the total volume of the optical element substantially equal to the volume of the uniform diffusion layer on the back surface side is to make the contact times with the molten salt different between the both surface sides of the substrate.

That is, the substrate back surface as a whole is protected with an ion permeation preventive masking material covered thereon, and then dipped initially in the molten salt, and the masking material is removed in the course of diffusion. Alternatively, a treatment in the order opposite to that mentioned above is practiced. That is, the substrate back surface is initially dipped in the molten salt without providing masking material, and then the masking material is provided in the course of diffusion.

As another method, there can be also employed the method of covering the back surface side with a masking material which can allow ion permeation to some extent. For example, the method can be employed in which a masking material provided with fine openings at sufficiently fine pitch is employed, and a continuous diffusion layer with uniform thickness is formed by diffusion of the ions permeated through these openings group toward the side direction. Further, a method of employing a porous material as the above-mentioned masking material can be also employed. The porous material can be provided on the substrate by sputtering ceramics at which the film becomes porous if the thickness of the ceramic film is made thin enough.

In the present invention, the volumes of the ion diffusion regions on both surfaces of the substrate are not required to be completely the same, but the volume ratio range permissible in practical application, which may differ depending on the thickness, the size, the permissible flatness of the glass substrate, the opening ratio of the masking material, etc., may be preferably within the range of from 50 to 150%, more preferably from 70 to 130%, on the other surface side, with the ion diffusion region volume on one surface side being made 100%.

According to the present invention, since the ion amounts diffused from the front and back surfaces of the substrate are substantially equal, the interplanar stresses created due to the difference in ion radius of the ions exchanged during ion exchange are balanced between the front and back surfaces, whereby a thin flat plate optical element of high flatness with sufficiently small warping deformation caused by stress difference can be obtained.

Also, since one surface of the substrate has an optically uniform diffusion layer, even when light is permitted to be incident in the vertical direction on the substrate as in flat plate microlens, no disturbance will be given to the light rays.

The thickness of the substrate is preferably from 0.5 to 5 mm, and more preferably from 0.5 to 2 mm. If the thickness is more than 5 mm, the stiffness of the substrate is sufficiently high to prevent the abnormal deformation of the substrate which is a problem to be solved by the present invention. If the thickness is less than 0.5 mm, the diffusion layer and the optical element may contact each other, and thus the formation of an optical element having desired properties tends to be difficult.

Referring now to the embodiment shown in the drawings, the present invention is described in more detail.

Figure 2:
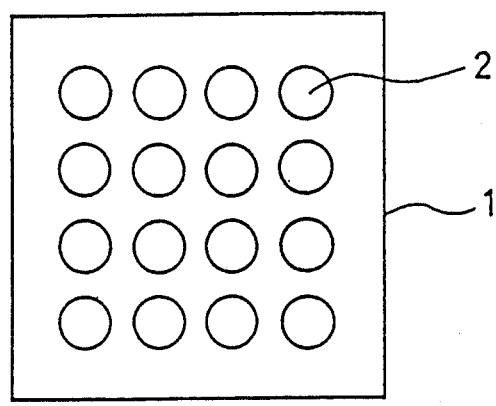
FIG. 2 is its plan view.

FIG. 1 shows a sectional view of the flat plate microlens according to the present invention, and FIG. 2 its front view. On one surface side of a transparent glass substrate 1 of which both surfaces are parallel flat surfaces, a large number of approximately semispherical lens portions 2 are arranged at intervals, which lens portions have a larger refractive index than the surrounding portion formed by ion diffusion. On the other substrate surface, a diffusion layer 3 having a uniform thickness is formed over the whole substrate surface by diffusion of the same ions as those used for formation of the above lens portions 2.

And, the total volume of the lens portions 2 is substantially equal to that of the uniformly diffused layer 3.

In the flat plate microlens with the above-mentioned constitution, the light ray 4 incident vertically on the substrate surface provided with the uniformly diffused layer 3 permeates therethrough as such without refraction to enter the lens portions 2 to be converged. Since the total volume of the ion diffusion regions 2 and that of 3 on both surfaces of the substrate are substantially equal, the strain accompanied with ion diffusion are balanced between both surfaces of the substrate, whereby substantially no warping deformation will be generated.

Figure 3:
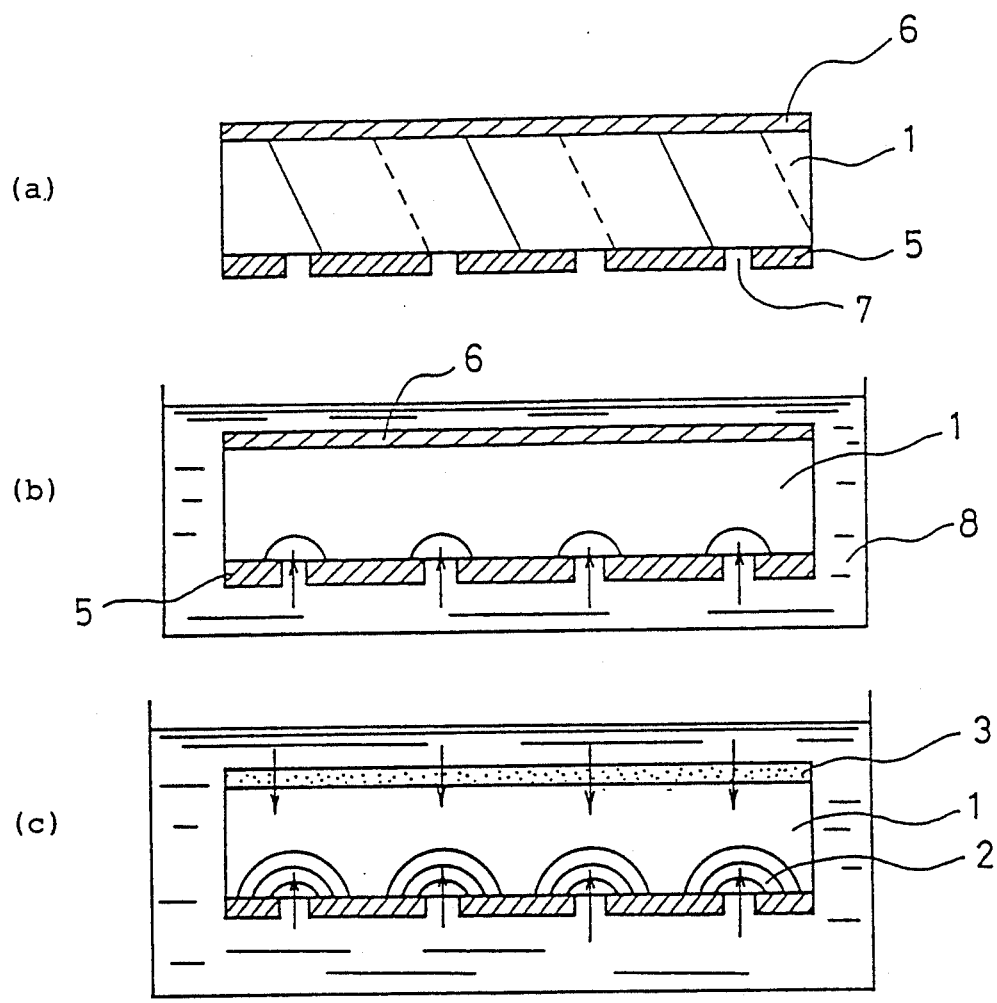
FIGS. 3(a) to 3(c) are sectional views showing stepwise an example of the method for preparing the flat plate optical element of the present invention.

FIGS. 3a to 3c show a preferable method for preparing the flat plate optical element of the present invention. First, both surfaces of a glass substrate 1 of alkali borosilicate glass, etc. are covered with ion diffusion preventive masks 5, 6 comprising a metal film such as Ti, Al, etc. And, on one of the masks 5 is formed an opening 7 with a predetermined lens arrangement pattern by use of the known photolithographic technique, as described, e.g., in *Hikari Tsushin Handbook* (Optical Communication Handbook), pp. 334–341, edited by H. Yanai, published by Asakura Shoten, Japan, on Sept. 1, 1982 (FIG. 3(a)).

The glass substrate 1 applied with the above masks 5, 6 is dipped in a molten salt 8 containing ions to be diffused, for example, thallium nitrate ($TlNO_3$) to effect ion exchange treatment (FIG. 3(b)).

As an example, at about 465° C., dipping is continued for 30 hours which corresponds to about 60% of the ion exchange treatment time necessary for a predetermined lens formation. Then, the substrate 1 is once taken out from the molten salt 8, and the masking material 6 on the back surface side is removed by etching. At this time, the lens surface side is protected with a film such as resist, etc. Subsequently, the substrate 1 is dipped again in the same molten salt as described above for about 18 hours to effect additional ion exchange (FIG. 3(c)) and form a desired lens, followed by removal of the masks 5, 6 on both surfaces.

According to the method as described above, the warping amount can be suppressed, for example, at 40

μm or less for a substrate of 100 mm square with a thickness of 0.6 mm.

In the above embodiment, ion exchange was effected in two steps to form the uniformly diffused layer on the back surface, but as another method, it is also possible to form a similar uniformly diffused layer by one ion exchange treatment by providing an opening which is by far smaller in area than the mask opening area for obtaining the desired optical element on the back surface side mask, and utilizing the overlapping of the diffusion region with the adjacent opening.

According to the present invention, deformation such as warping, etc. caused by nonuniform expanding, shrinking force between the substrate front and back surfaces can be prevented, whereby it has become possible to prepare a flat plate optical element excellent in optical characteristics without disturbance of the direction of the incident ray at the surface on the opposite side. Particularly, the present invention is effective in forming an optical element having an area of 50% or more of the surface area of the substrate.

While the invention has been described in detail and with reference to specific examples thereof, it will be apparent to one skilled in the art that various changes and modifications can be made therein without departing from the spirit and scope thereof.

What is claimed is:

1. A flat plate optical element comprising an optical element with a predetermined pattern formed by ion diffusion from a restricted region within a flat substrate, wherein an ion diffusion layer having a uniform thickness is formed with the same ions as those used for forming said optical element on the whole surface of the substrate opposite to the surface on which said optical element is formed, and wherein the volume ratio of the total volume of said optical element to the total volume of said diffusion layer is from 50 to 150%.

2. A flat plate optical element as claimed in claim 1, wherein the volume ratio of the total volume of said optical element to the total volume of said diffusion layer is from 70 to 130%.

3. A flat plate optical element as claimed in claim 1, wherein said optical element has an area of 50% or more of the surface area of said substrate.

4. A flat plate optical element as claimed in claim 1, wherein said element is fine lens.

5. A flat plate optical element as claimed in claim 1, wherein said element is light waveguide.

6. A flat plate optical element as claimed in claim 1, wherein the thickness of said flat substrate is from 0.5 to 5 mm.

7. A flat plate optical element as claimed in claim 6, wherein the thickness of said flat substrate is from 0.5 to 2 mm.

8. A method for preparing a flat plate optical element, said element having a front surface and a back surface, said method comprising the steps of:
   coating the front surface of said substrate with a masking film provided with at least one opening with a predetermined optical element pattern;
   diffusing ions, which give change to the refractive index of said substrate material, through said opening to thereby form an optical element portion on said front surface of said substrate; and
   diffusing the same ions uniformly over the whole of the back substrate surface, wherein the ion diffusion region volumes are controlled by controlling the diffusion treatment time on the respective surfaces or by providing on the back surface a masking film which restricts the rate of ion permeation and wherein the volume ratio of the total volume of said optical element to the total volume of said diffusion layer is from 50 to 150%.

9. A method as claimed in claim 8, wherein said masking film which restricts ion permeation is provided with fine openings at sufficiently fine pitch capable of forming a continuous diffusion layer having uniform thickness by diffusion of said ions permeated through said fine openings toward the side direction.

* * * * *